United States Patent [19]

Clark et al.

[11] Patent Number: 5,063,393

[45] Date of Patent: Nov. 5, 1991

[54] INK JET NOZZLE WITH DUAL FLUID RESONANCES

[75] Inventors: James E. Clark, Naperville; Robert I. Keur, Niles, both of Ill.

[73] Assignee: Videojet Systems International, Inc., Chicago, Ill.

[21] Appl. No.: 661,660

[22] Filed: Feb. 26, 1991

[51] Int. Cl.[5] ........................ G01D 15/18; B23P 15/00

[52] U.S. Cl. ................................ 346/75; 346/140 R; 29/890.1

[58] Field of Search ............................ 346/75, 140 R; 29/890.1

[56] References Cited

U.S. PATENT DOCUMENTS

| | | | |
|---|---|---|---|
| 4,032,928 | 6/1977 | White et al. | 346/140 R |
| 4,388,627 | 6/1983 | Umezawa | 346/75 |
| 4,727,379 | 2/1988 | Souruis et al. | 346/75 |

*Primary Examiner*—Benjamin R. Fuller
*Assistant Examiner*—Gerald E. Preston
*Attorney, Agent, or Firm*—Rockey and Rifkin

[57] ABSTRACT

An ink jet nozzle having more than one fluid resonance in the frequency range of interest is achieved through multi-chamber construction techniques. If the dual resonances are sufficiently close together in frequency, a robust printing region is obtained relatively immune to variations in temperature, drive voltage and ink composition.

7 Claims, 2 Drawing Sheets

INK JET NOZZLE WITH DUAL FLUID RESONANCES

BACKGROUND OF THE INVENTION

This invention relates to the design of nozzles employed in ink jet printing. More specifically, it relates to ink jet nozzles used for improved resolution and high resolution ink jet printers (printers having orifices on the order of 50 and 36 microns respectively). As is well known in this art, as the orifice size decreases the resolution increases, while the sensitivity of the printer to changes in the characteristics of the ink, operating temperature or frequency increases. This creates additional difficulties in the design of ink jet nozzles intended for high resolution printing In a typical ink jet system, a nozzle is selected which has an acoustic resonance at approximately the operating frequency of the oscillator which is used to break a stream of ink into droplets. This operating frequency, referred to hereafter as "$f_0$", is selected based on a number of operating parameters of the ink jet system including the desired resolution of the printer, the rate of dot matrix character formation, ink stream stability, etc.

Existing nozzles as, for example, the type disclosed in U.S. Pat. No. 4,727,379, assigned to the present assignee, and for which the present invention is an improvement, do not provide entirely satisfactory drop configurations for high resolution printing, particularly with certain inks. As is known in this art, satellites or small drops located between the main drops, can be generated when a stream of ink breaks up. Such satellites may degrade the quality of the printing process. These satellites can be forwardly merging, rearwardly merging or infinite. The first two terms indicate that during the flight of the ink drops, the satellites disappear prior to reaching the deflection field by merging forwardly with the main drops in front of them or rearwardly with the main drops that follow them. Infinite satellites do not merge at all and, depending upon the application, can interfere with proper printing.

Satellite problems are particularly acute for high resolution printers Such devices generally require a satellite-free ink stream. Rearwardly merging satellites however cause charge transfer between adjacent drops and are, therefore undesirable. Forwardly merging satellites produce a satellite free stream of drops entering the deflection field. Such condition permits precision placement of the drops on the substrate to be marked.

In standard, medium resolution, ink jet systems the nozzle is selected to have a single fluid resonance in its ink cavity which is closely matched to a desired nozzle operating frequency $f_0$. This frequency matching permits operation of the nozzle using a relatively low stimulation voltage. On either side of the resonance are anti-resonant regions. The drive voltage necessary to operate the nozzle rises rapidly from the resonance point to values, at or substantially near the anti-resonances, which may exceed the capability of the transducer and its associated stimulation voltage source. Because of this relatively narrow operating frequency range, a typical ink jet system, when used for high resolution printing, is undesirably sensitive to changes in temperature, drive voltage or frequency drift.

It is accordingly an object of the present invention to provide an improved nozzle for high resolution ink jet printing which overcomes these disadvantages of the prior art nozzle designs.

It is also an object of the invention to provide a more robust operating region for low and standard resolution ink jet printers by using the principles of the invention.

SUMMARY OF THE INVENTION

Specifically, whereas prior art nozzles are in general single chamber designs having only a single useable resonance near the operating frequency, $f_0$, the present invention employs a design having multiple chambers (at least two) whereby two fluid resonances are created in the region of the system operating frequency, $f_0$. The dimensions of the chambers are selected so that the resonances are sufficiently close together that the nozzle can be driven in the non-resonant frequency range between the resonances without exceeding the voltage capacity of the stimulation source.

It is thus an object of the present invention to provide a multi-chamber nozzle structure that has multiple fluid resonances substantially centered about the nozzle operating frequency $f_0$.

Another advantage of the invention is to provide such a design wherein a wide range of stimulation amplitudes produce acceptable satellite drop configurations resulting in a decreased sensitivity to temperature or ink composition variation.

It is another object of the invention to provide a dual resonant nozzle which can be driven with an operating frequency in the non-resonant region located between the resonant frequencies.

It is a further object of the present invention to provide a multi-chamber ink jet nozzle which can produce high resolution printing over a wider range of operating frequencies and stimulation voltages than was heretofore possible and which is therefore less subject to degradation in print quality due to temperature changes, changes in frequency or drive voltage during long periods of operation of such equipment.

It is a further object of the invention to provide a dual resonant frequency nozzle construction which can be adapted to a greater number of ink compositions.

These, and other objects of the invention, will become apparent from the remaining portion of the specification.

DETAILED DESCRIPTION

As indicated in the background portion of the specification, the present invention relates to an ink jet nozzle design having at least two resonant frequencies lying near the operating frequency $f_0$. This is achieved using a multi-chamber ink jet nozzle design wherein each of the chambers has a different characteristic fluid resonance. According to the preferred embodiment of the invention, the fluid resonances lie on either side of the operating frequency and are sufficiently close together that even the anti-resonance point there between requires a relatively low stimulation voltage and, therefore, the nozzle can be easily driven at frequencies anywhere between the two resonances.

Figure 1:
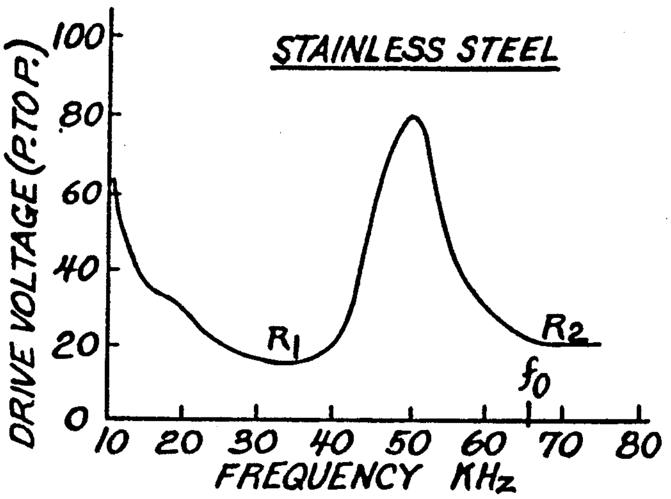
FIG. 1 PRIOR ART
FIG. 1 is a response diagram illustrating a typical single chambered stainless steel nozzle found in the prior art. It is adapted from a figure contained in U.S. Pat. No. 4,727,379.

Referring to FIG. 1, there is shown a frequency versus drive voltage response curve for a typical stainless steel single chamber nozzle in the prior art. As can be seen from the drawing, such a nozzle has fluid resonances designated $R_1$ and $R_2$. In typical operation, the operating frequency $f_0$ of the nozzle is selected to match one of the resonance points, in this case about 35 kHz or 70 kHz, so that the drive voltage for the nozzle is maintained within the capabilities of the system. As can be seen, should the frequency of operation change, the drive voltage would increase significantly. More importantly, satellite configurations unsuitable for quality printing are obtained. While such nozzles are acceptable for many ink jet applications, when high resolution is desired, it is necessary to operate more precisely in a satellite free stream condition. It is desirable to design a nozzle which insures satellite free operation over a range of drive voltages and which accommodates a wider range of operating frequencies.

Figure 2:
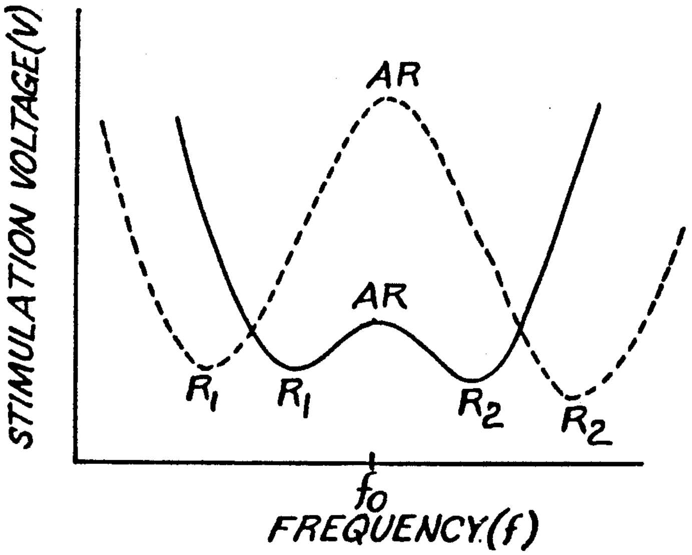
FIG. 2 is a response diagram useful in explaining the chamber design according to the present invention having dual resonances.

Referring to FIG. 2, the principles of the present invention are illustrated. A multi-chamber nozzle is provided having at least two fluid resonances indicated as $R_1$ and $R_2$ on both the solid and dashed curves. As can be seen, the resonances $R_1$ and $R_2$ are centered on either side of a desired frequency $f_0$, the system operating frequency. As is apparent from FIG. 2, the anti-resonance, located between the resonant points, is significantly greater for the dashed line curve than for the solid line curve. It can be seen from FIG. 2 that an ink jet nozzle could be driven at either resonance point $R_1$ or $R_2$ if the operating frequency were chosen to correspond therewith. It can also be seen from FIG. 2 that it would be difficult to operate at the frequency $f_0$ if resonances chosen are those illustrated by the dashed curve because the anti-resonance is too high, requiring a stimulation voltage which would exceed the transducer drive capacity of a typical ink jet system. Further, such operation would not be satellite free as desired.

On the other hand, if $R_1$ and $R_2$ are closer together, as shown on the solid line curve, the anti-resonance is significantly lower and can be driven by a typical ink jet system. Further, the drops are satellite free and the frequency $f_0$ can be selected to be at approximately the anti-resonance point between $R_1$ and $R_2$. The difference between the curves illustrated in FIG. 2 is the band width or frequency range between the $R_1$ and $R_2$ resonances. The solid curve has the resonances relatively close together while the dashed line curve has the resonances further apart. Thus, as a first important aspect of the present invention, it is necessary that the fluid resonances of the chamber be sufficiently close together that the anti-resonance point lying therebetween is maintained relatively low in terms of the voltage value required to operate at such frequency.

Figure 4:
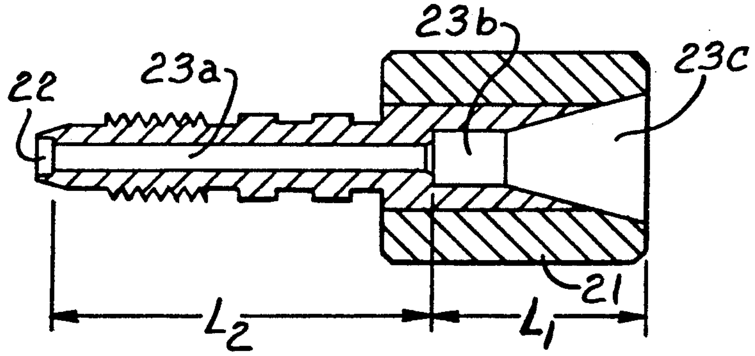
FIG. 4 is a preferred embodiment of a multi-chamber nozzle tube for obtaining the benefits of the present invention.

For example, in connection with the nozzle shown in FIG. 4, to be described hereafter, it was found that an operating frequency of approximately 80 kHz could be utilized having resonances at approximately 70 kHz and 90 kHz. For such a nozzle, the sinusoidal stimulation voltage values are well within the operating values of a typical ink jet system (approximately 30 to 50 volts peak-to-peak). The value will vary depending upon the particular ink being used and temperature variations during operation.

As thus far described, it will be understood that a multi-chamber nozzle, having at least two resonances, which are relatively close together and centered on either side of the operating frequency $f_0$ is desired. The advantages of this operation will now be explained.

Figure 3:
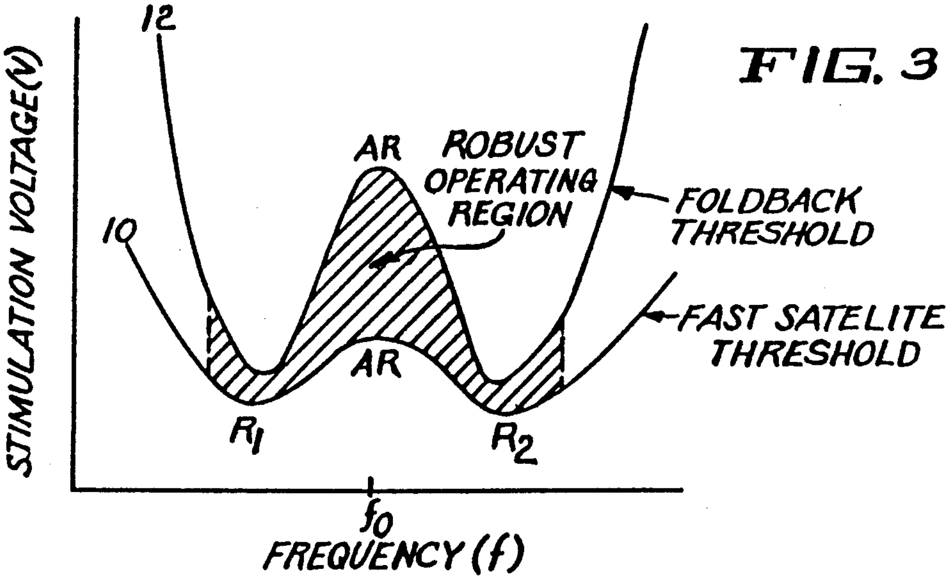
FIG. 3 is a diagram similar to FIG. 2 illustrating the benefits of the present design in terms of stability over a variety of frequencies and stimulation voltages.

Referring to FIG. 3, there is a response diagram illustrating the curves obtained for a nozzle designed according to the present invention. The lower curve indicated by the numeral 10 shows, for a typical ink the lower limit for satellite-free operation. That is, below this threshold the satellites do not forwardly merge or forwardly merge too slowly to insure satellite free drops entering the deflection field. The second curve, indicated by numeral 12, shows the stimulation values at the foldback threshold. The foldback point is the minimum drop breakoff distance as measured from the nozzle and indicates a value above which reliable satellite free printing cannot usually be obtained. Thus, the curves 10 and 12 in FIG. 3 define an acceptable operating range of stimulation voltages over a range of frequencies. As indicated by the shaded area between the curves, there is defined a "robust" operating region having several advantages over prior designs. As can be seen at the frequency $f_0$, a wide variation in stimulation voltage can be tolerated and produce acceptable high resolution printing.

It is true that at the foldback threshold (curve 12), the anti-resonance stimulation voltage is significantly larger than when operating near the precision printing threshold (curve 10). Nevertheless, both values of stimulation voltage can easily be handled by the operating system. Thus, the nozzle design according to the present invention is relatively stable over a wide range of stimulation voltages.

Similarly, there is a relatively wide or robust operating region on either side of the frequency $f_0$, thereby ensuring stable operation even with frequency drift. Indeed, as indicated by the hatched lines, the system can produce high quality printing over a wide range of both frequencies and stimulation voltages due to the closely spaced dual resonances.

In summary, according to the present invention, a multi-chamber nozzle is provided having at least two fluid resonances which are closely spaced about a chosen operating frequency whereby the anti-resonance is approximately at the operating frequency. The result is a robust, satellite free operating region in which changes in ink can be readily accommodated. A wide variety of inks can be accommodated with such a construction, including ketone, alcohol, and water based. Thus, multiple ink types can be used with one nozzle design, as compared to the prior art where nozzles were ink specific.

Referring to FIG. 4, there is shown a preferred embodiment of a nozzle tube according to the invention which produces two characteristic resonances of the type described in the foregoing portion of the specification. FIG. 4 illustrates a multi-chamber nozzle tube 21 having a recessed orifice seat 22 and a concentric ink cavity comprised of three distinct sections: a front chamber 23*a*, a center chamber 23*b*, and a rear chamber 23*c*. In the illustrated embodiment, the diameters of the center chamber 23*b* and the front chamber 23*a* are in the ratio of 2:1. Chamber 23*c* is concentrically tapered to provide a smooth transition for fluid flow from the filter chamber 24 (FIG. 5).

Figure 5:
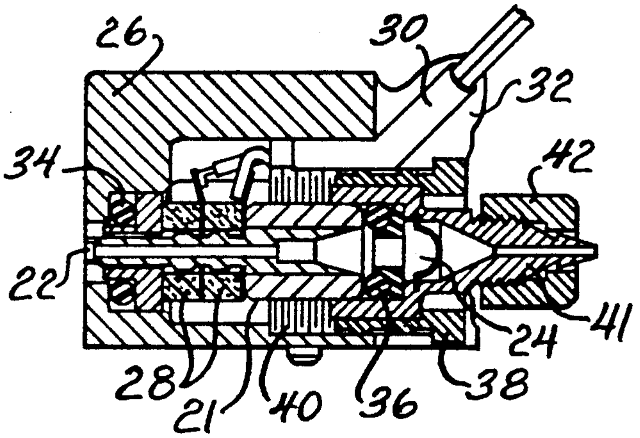
FIG. 5 is a drawing of the FIG. 4 embodiment illustrating the manner in which it is operably connected in a nozzle assembly.

FIG. 5 illustrates the nozzle tube of FIG. 4 in a typical assembly to form a finished ink jet nozzle. As shown in FIG. 5, the nozzle tube 21 is enclosed within a housing 26. Piezoceramic drivers 28 surround the nozzle for impressing the stimulation voltage on it to cause ink drops to form as the stream leaves the end of the nozzle orifice 22. Electrical leads are contained in a conduit 30 affixed to the housing by cementious material 32. O-rings are provided at 34 and 36 to sealingly secure the nozzle to the housing. As indicated, a filter chamber 24 is located at the inlet side of the assembly to prevent particulate impurities in the ink supply from reaching the nozzle orifice. A retaining nut 38 secures the nozzle in the housing by engaging the threads 40 formed in the housing wall. A barb fitting 41 connects the ink supply to the nozzle and, in turn, is retained by a nut 42 during normal operation. The assembly as thus illustrated in FIG. 5 is connected to a typical ink jet system providing a supply of pressurized ink and the appropriate video or stimulation voltage drive signal to the piezoelectric material, as known by those skilled in this art.

Unlike prior art nozzles, the nozzle tube illustrated in FIG. 4 is multi-chambered in such a manner as to produce at least two resonances centered about a desired operating frequency. Further, the resonances are selected so that they are close enough together that the anti-resonance point therebetween is drivable in terms of the stimulation voltage required to create a stream of discrete drops useful for precision, satellite free printing.

More specifically, the nozzle needs to have a dual resonator inside its fluid cavity. The fluid cavity then gives rise to resonances which lie on either side of a desired operating frequency and which are not too far apart. To date, based on experimental data that has been assembled, it has been determined that the resonances $R_1$ and $R_2$, shown in FIGS. 2 and 3, should not be further apart than approximately 20 kHz. If the resonances are further apart, the anti-resonance, located therebetween, may become too high to be drivable. Thus, returning to the example given earlier in the specification, if the desired operating frequency is 80 kHz, the nozzle should be designed so that the resonances $R_1$ and $R_2$ are at about 70 kHz and 90 kHz, respectively. Strictly for exemplary purposes, when the 20 kHz maximum is adhered to, it will require not more than 50 volts peak-to-peak to drive the nozzle at the anti-resonance point. When the resonances are separated by more than 20 kHz, values on the order of 100 volts peak-to-peak are not uncommon.

The design parameters for a nozzle having the desired characteristics indicated can be understood from the following discussion. The fluid resonances arise from a nozzle tube that is specifically designed to incorporate ink cavities which have distinct characteristic lengths $L_1$ and $L_2$ associated with the resonant frequencies $R_1$ and $R_2$. The general formula for computing a resonant frequency for a cylindrical tube resonator is:

$$R_f = \frac{kv}{4(L + d)}$$

where v is the velocity of sound in ink, k is an integer corresponding to the desired harmonic and d is an end effect factor for the tube.

The preferred embodiment of the invention shown in FIG. 4 provides two resonant cavities. The lower resonant frequency $R_1$ is attributed to the length $L_1$ of a composite ink cavity formed by chambers 23*b* and 23*c* resonating in its fundamental mode (i.e., first harmonic) and may be determined according to the formula:

$$R_1 = \frac{2v}{4(L_1 + d_1)}$$

where v is the velocity of sound in the ink; $d_1$ is an experimentally determined end effect correction factor. This is so because chambers 23*b* and 23*c* constitute a resonator open at both ends.

The higher resonating frequency $R_2$ results from the length $L_2$ of chamber 23*a* resonating in its second harmonic mode according to the formula:

$$R_2 = \frac{3v}{4(L_2 + d_2)}$$

where v is again the velocity of sound and $d_2$ is another experimentally determined end effect correction factor. This chamber is a resonator closed at the orifice end and open at the other end.

By way of example, a nozzle designed according to the foregoing can be used with a methyl ethyl ketone (MEK) based ink and a 20 kHz band width centered about an operating frequency of approximately 80 kHz. $R_1$ and $R_2$ are approximately 70 kHz and 90 kHz, respectively. The velocity of sound for such an MEK-based ink is about 1270 meters per second. Other inks of practical interest have velocities of sound in the range of 1200 to 1650 meters per second.

The end effect factors, d are determined experimentally since prediction of end effect corrections on theoretical grounds is unreliable. In practice, a series of nozzle tubes with a range of values for $L_1$ and $L_2$ are fabricated. The resulting series of resonances $R_1$ and $R_2$ is determined from response curves similar to those depicted in FIG. 3. Analysis of the ($L_1$, $R_1$) and ($L_2$, $R_2$) data sets with the resonance formulae described herein yields empirical valves for $d_1$ and $d_2$. In all cases the principles of the invention may be practiced with good results by ignoring the d factors and simply "fine tuning" the chamber lengths until optimal response is obtained. Additional information concerning end correcting is provided in *Acoustics*, pp. 406 et seq. Alexander Wood, (Dover Publications 1966).

The foregoing description relates to the preferred embodiment of FIG. 4 in which a compound nozzle tube cavity construction provides two resonances centered about a desired operating frequency. The invention, however, is not limited to the specific construction shown in FIG. 4 or any specific resonant mode or type of resonator. For example, various modes including, but not limited to, the fundamental and its harmonics could be used from other acoustic resonators such as Helmholtz cavities, cylindrical pipes, conical pipes or combinations thereof which may be acoustically open or closed at any end. The key concept of this invention is that dual resonators are employed to produce two resonant frequencies of interest, one higher than and one lower than the nozzle operating frequency $f_0$ which frequency lies between the resonant frequencies near a drivable anti-resonance point.

Figure 6:
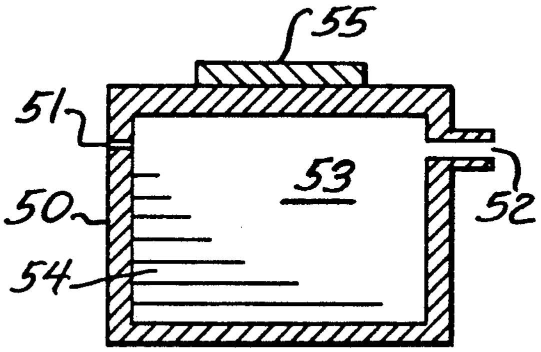
FIG. 6 is an alternate nozzle design having multiple chambers to produce multiple resonances according to the present invention.

As an example of the more general application of the principles of the present invention, multiple resonators could be used to cause resonances surrounding the nozzle operating frequency, thus creating a substantially flat frequency response region near the nozzle operating frequency. FIG. 6 illustrates a nozzle structure that could be used for this purpose. The nozzle tube 50 contains pressurized ink which enters a cavity 53 through an inlet 52 and exits through an orifice 51. A resonator array 54, which consists of a multiplicity of partitioned chambers of various lengths provides fluid resonances which extend both higher and lower than the operating frequency of the transducer element 55 used to stimulate the marking fluid. This permits use of a single housing with different orifice sizes and/or operating frequencies.

From the foregoing, it will be seen that it is possible to calculate desired resonance values for a given operating frequency whereby a whole class of nozzles may be designed for a particular application. The critical parameters of this design effort are: (1) that the operating frequency be located between two resonant frequencies created by a multi-chambered design; (2) the resonance frequencies must be sufficiently close together (on the order of 20 kHz) that the anti-resonance point located therebetween is drivable. By drivable it is meant that the peak-to-peak value does not exceed the capacity of the printer with which the nozzle is used and which also permits operation at the resonance points or any location therebetween. When these design criteria are put into effect, the result is a nozzle design which is robust in the sense that it is relatively insensitive to changes in ink composition, temperature, frequency or drive voltage during operation. Thus, a stream of drops which forwardly merge and are satellite free upon entering the deflection field can be produced for printing with a wide range of inks and over a wide variety of operating conditions without the need to select specific nozzles for each type of ink or otherwise to more rigidly control drive voltages, temperatures, or ink compositions. This is ideally suited for high resolution printing applications, but is also advantageously employed for low and medium resolution printing applications.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed is:

1. A nozzle for drop marking comprising:

(a) a housing defining at least two fluid chambers therein adapted to receive a supply of marking fluid under pressure, each chamber having a characteristic fluid resonant frequency;

(b) transducer means for applying a stimulation voltage having an operating frequency $f_0$ to cause drop formation as said marking fluid issues from said housing;

(c) said fluid chambers being dimensioned so that one fluid resonant frequency is above the operating frequency $f_0$, while the other fluid resonant frequency is below $f_0$, said resonant frequencies being sufficiently close together that the magnitude of the stimulation voltage at an anti-resonance frequency therebetween is drivable by said transducer means;

whereby a robust operating region is defined between the resonances where substantially satellite free marking can occur while tolerating variations in stimulation voltage, temperature and the composition and/or characteristics of the marking fluid.

2. The device of claim 1 wherein said housing includes an inlet for the marking fluid and a nozzle orifice through which the marking fluid is ejected.

3. The device of claim 1 wherein said housing defines two fluid chambers, each chamber having an effective length L and wherein the fluid resonant frequency of each chamber is given by the relationship $$R = \frac{kv}{4(L + d)}$$

where R is the resonant frequency; k is an integer corresponding to a desired harmonic and d is an end effect factor for said chamber.

4. The device of claim 1 wherein the housing is dimensioned to define fluid chambers having fluid resonant frequencies which are not more than about 20 kHz apart and which contain the operating frequency $f_0$ therebetween.

5. The device of claim 1 wherein the housing is formed of stainless steel and the housing has two fluid chambers.

6. A nozzle for drop marking comprising:

(a) a housing defining at least two fluid chambers therein adapted to receive a supply of marking fluid under pressure and having at least one orifice, each chamber having a characteristic fluid resonant frequency;

(b) transducer means for applying a stimulation voltage having an operating frequency $f_0$ to form drops as said marking fluid issues from said housing orifice, the magnitude of the stimulation voltage exceeding a fast satellite threshold over a range between the two fluid resonant frequencies but less than the foldback threshold over the same range;

(c) said fluid chambers being dimensioned so that one fluid resonant frequency is above the operating frequency, $f_0$, while the other fluid resonant frequency is below $f_0$, said resonant frequencies being sufficiently close together that the magnitude of the stimulation voltage at an anti-resonant frequency is drivable by said transducer means;

whereby a robust operating region is defined.

7. A method for constructing a drop marking device comprising the steps of:

(a) forming a housing defining at least two fluid chambers therein adapted to receive a supply of marking fluid under pressure and having at least one orifice, each chamber having a characteristic fluid resonant frequency;

(b) coupling to said housing a transducer to apply a stimulation voltage having an operating frequency $f_0$ to form drops as said marking fluid issues from said housing orifice, the magnitude of the stimulation voltage exceeding a fast satellite threshold over the frequency range between the two fluid resonant frequencies but less than a foldback threshold over the same range;

(c) dimensioning said fluid chambers so that one fluid resonant frequency is above the operating frequency $f_0$, while the other fluid resonant frequency is below $f_0$, said resonant frequencies being sufficiently close together that an anti-resonance frequency therebetween is drivable by said transducer;

whereby a robust operating region is defined.

* * * * *